United States Patent
Coyle et al.

(10) Patent No.: US 7,310,653 B2
(45) Date of Patent: Dec. 18, 2007

(54) METHOD, SYSTEM, AND PRODUCT FOR MAINTAINING SOFTWARE OBJECTS DURING DATABASE UPGRADE

(75) Inventors: Mark Coyle, San Francisco, CA (US); Peter Lim, Redwood City, CA (US); Shuang Huang, Freemont, CA (US)

(73) Assignee: Siebel Systems, Inc., San Mateo, CA (US)

( * ) Notice: Subject to any disclaimer, the term of this patent is extended or adjusted under 35 U.S.C. 154(b) by 648 days.

(21) Appl. No.: 10/113,848

(22) Filed: Mar. 28, 2002

(65) Prior Publication Data

US 2007/0220065 A1   Sep. 20, 2007

Related U.S. Application Data

(63) Continuation of application No. 09/825,444, filed on Apr. 2, 2001, now abandoned.

(51) Int. Cl.
  *G06F 17/30*   (2006.01)
(52) U.S. Cl. .................................. 707/203; 717/170
(58) Field of Classification Search ........ 707/200–205, 707/8; 717/170, 168
  See application file for complete search history.

(56) References Cited

U.S. PATENT DOCUMENTS

| | | | | |
|---|---|---|---|---|
| 5,297,279 | A * | 3/1994 | Bannon et al. | 707/103 R |
| 5,960,189 | A * | 9/1999 | Stupek et al. | 717/169 |
| 6,026,412 | A * | 2/2000 | Sockut et al. | 707/200 |
| 6,367,077 | B1 * | 4/2002 | Brodersen et al. | 717/170 |
| 6,385,770 | B1 * | 5/2002 | Sinander | 717/170 |
| 6,457,021 | B1 * | 9/2002 | Berkowitz et al. | 707/201 |
| 6,519,613 | B1 * | 2/2003 | Friske et al. | 707/202 |
| 6,574,635 | B2 * | 6/2003 | Stauber et al. | 707/103 R |
| 6,606,634 | B2 * | 8/2003 | Craig | 707/102 |
| 6,999,977 | B1 * | 2/2006 | Norcott et al. | 707/203 |
| 7,076,778 | B2 * | 7/2006 | Brodersen et al. | 717/170 |
| 7,080,371 | B1 * | 7/2006 | Arnaiz et al. | 717/170 |
| 2002/0004799 | A1 * | 1/2002 | Gorelik et al. | 707/201 |
| 2002/0059280 | A1 * | 5/2002 | Slesinsky | 707/100 |
| 2003/0093433 | A1 * | 5/2003 | Seaman et al. | 707/102 |
| 2003/0135478 | A1 * | 7/2003 | Marshall et al. | 707/1 |

* cited by examiner

*Primary Examiner*—Debbie M Le
(74) *Attorney, Agent, or Firm*—Campbell Stephenson LLP

(57) ABSTRACT

Techniques to support modification of certain data in a database during an upgrade to a new version. In one method, objects in an original database are marked as either modifiable or read-only, with changes being allowed for modifiable objects during the upgrade. An upgraded database of objects is generated based on objects in the original database (e.g., by copying objects in the original database and upgrading the copied objects to new schema and binaries). Changes to modifiable objects in the original database (e.g., after these objects have been copied) are logged. After the upgraded database has been created, objects in this database may be updated (e.g., individually or all at once) by identifying modifiable objects in the original database having changes not yet incorporated into the upgraded database and updating objects in the upgraded database based on the modified objects in the original database.

22 Claims, 13 Drawing Sheets

METHOD, SYSTEM, AND PRODUCT FOR MAINTAINING SOFTWARE OBJECTS DURING DATABASE UPGRADE

CROSS-REFERENCE TO RELATED APPLICATION

This application is a continuation of U.S. application Ser. No. 09/825,444, entitled "Method and Apparatus for Maintaining Software Objects During Database Upgrade," filed Apr. 2, 2001 now abandoned, which is incorporated herein by reference in its entirety for all purposes.

BACKGROUND OF THE INVENTION

The present invention relates generally to computer processing, and more particularly to techniques for maintaining software objects during an upgrade of a database.

Many complex software applications have been created to assist business enterprises manage and operate their businesses. An important class of such software applications focuses in the area of customer relationship management (CRM). A CRM application allows an enterprise to maintain track of various entities such as contacts, products, activities, service requests, and so on, and to define the relationships between the entities with sets of rules (e.g., business opportunities). Each entity and business function may be implemented as an object, which may represent a collection of data and functions that describe the entity or business function as well as the operations capable of being performed on or by the entity or business function. The objects are typically stored in a database that may be accessed by various software applications and via various channels (i.e., communication means).

A database is typically implemented with a particular schema and binaries. The schema describes the organization and format of the database, e.g., the tables used to identify and describe the data stored in the database and the relationships between the tables. The binaries represent the actual data, which is typically stored in the format specified by the schema.

A database may be revised or upgraded over time to provide enhanced features and functionality, and to possibly remedy any prior deficiencies. The new database may be associated with a new schema and binaries. Conventionally, a database may be upgraded to a new version by (1) bringing the database offline to prevent modification to the data in the database and (2) executing an upgrade software application that generates the new schema and binaries for an upgraded database based on the schema and binaries for the original database. The upgrade software application effectively transforms the original database to the upgraded database.

For some business enterprises, it may be preferable or necessary to support access and modification of at least some of the objects in the original database during the time the upgrade process is performed. Thus, techniques that can be used to upgrade a database while at the same time allow for modification of certain objects are highly desirable.

SUMMARY OF THE INVENTION

The invention provides techniques to support modification of certain data in a database during an upgrade to a new database and software version. In an aspect, some (or possibly all) of the objects in an original database to be upgraded may be designated as being modifiable during the upgrade process and are marked as such. The designation may be achieved using a table, and modifiable objects may be represented using another representation (e.g., "integration" objects). After the objects in the original database have been copied to generate the upgraded database, changes to modifiable objects are collected and logged. These changes may saved using another representation (e.g., XML documents). Once the upgraded database is created, the objects in this database may be updated with changes to corresponding modifiable objects in the original database. The modified objects in the original database may be sent (e.g., individually when requested, or all at once upon receiving an indication to sent all changes) and identified as having been sent. A synchronization scheme may be used maintain data integrity and to ensure that the latest version of an object is accessed from both the original and upgraded databases.

A specific embodiment of the invention provides a method for upgrading a database of objects. (An object may be defined as a hierarchical collection of tables.) In accordance with the method, objects in a first (original) database are marked as either modifiable or read-only, with modifiable objects being allowed to be changed during the upgrade of the original database. A second (upgraded) database of objects is then generated based on objects in the original database. The upgraded database may be generated, for example, by copying objects in the original database and "upgrading" the copied objects to a new schema and new binaries (i.e., transformation between versions). Changes to modifiable objects in the original database (e.g., after these objects have been copied) are logged. At any point in time after the upgraded database has been created, objects in the upgraded database may be updated (e.g., individually or all at once). This update may be achieved by identifying modifiable objects in the original database that have been changed (e.g., from the versions used to generate the upgraded database or last versions sent to the upgraded database), and updating objects in the upgraded database based on the modified objects in the original database.

The invention further provides other methods, computer program products, and systems capable of implementing various aspects, embodiments, and features of the invention, as described in further detail below.

The foregoing, together with other aspects of this invention, will become more apparent when referring to the following specification, claims, and accompanying drawings.

DESCRIPTION OF THE SPECIFIC EMBODIMENTS

Figure 1A:
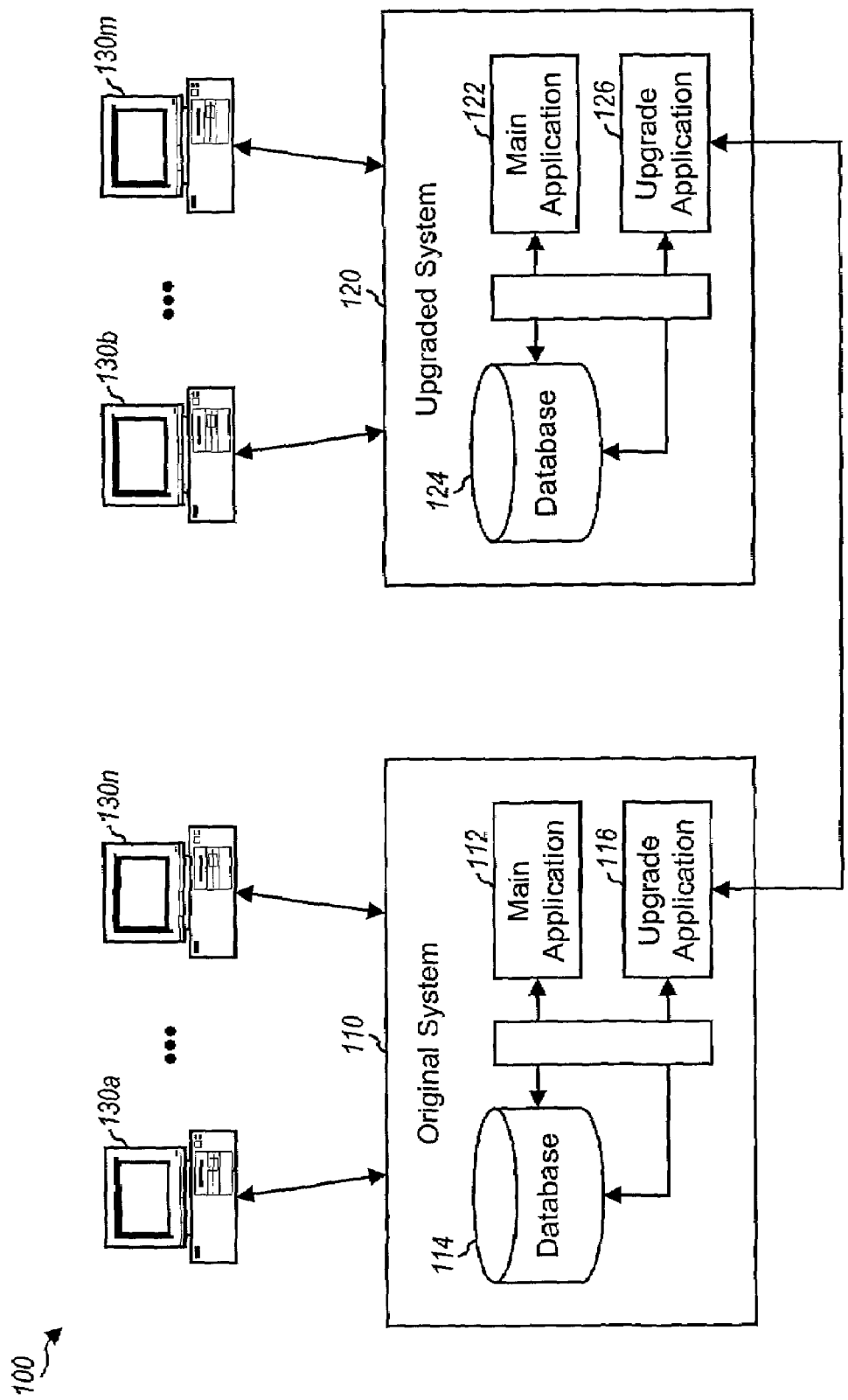
FIGS. 1A and 1B are diagrams of an embodiment of a system that may be capable of implementing various aspects and embodiments of the invention.

FIG. 1A is a simplified diagram of an embodiment of a system 100 that may be capable of implementing various aspects and embodiments of the invention. System 100 comprises a first ("original") system 110 and a second ("upgraded") system 120 that may interact with a number of clients 130. Systems 110 and 120 may represent two independent systems implemented on two sets of servers. Systems 110 and 120 may also represent a logical view of two versions of the same system during an upgrade process.

Original system 110 may include various software applications (which are collectively referred to as a main application 112) that interface with a database 114 via "middleware". Main application 112 provides various functions being supported by system 110 and interfaces with clients 130. Database 114 stores data used by main application 112 and provides or stores the data when and as requested. Database 114 typically implements a particular schema and stores the data as binaries that conforms to the schema.

System 110 may be revised or upgraded over time to provide enhanced features and functionality, and to possibly remedy any prior deficiencies. Correspondingly or independently, database 114 may also be revised or upgraded. An upgrade application 116 may be provided to facilitate the upgrade process.

In the embodiment shown in FIG. 1A, upgraded system 120 includes a main application 122 that interfaces with a database 124. After the upgrade process is completed, database 124 should include the data stored in database 114. However, the data may be stored based on a new schema that is different from the one used by database 114. Main application 122 may be designed to provide the functions previously supported by main application 112 and possibly new and/or revised functions. Main application 122 is typically also designed to support the new upgraded database 124.

An upgrade application 126 may be provided in upgraded system 120 to facilitate the upgrade process. In this case, upgrade application 126 may communicate with upgrade application 116 to implement the upgrade process, which is described in further detail below.

As noted above, systems 110 and 120 may represent different or the same system during an upgrade process. During the upgrade process, one or more clients 130 may interact with, and access the data stored in, original system 110. In accordance with an aspect of the invention, some (or possibly all) of the data in database 114 may be allowed to be modified during the upgrade process. After and possibly during the upgrade process, one or more clients 130 may interact with, and access the data stored in, upgraded system 120. As part of the upgrade process, any data in database 114 that has been modified (as allowed) are also transferred to the upgraded system 120. In this manner, access and modification of data in the original database is supported during the upgrade process while data integrity is maintained.

Figure 1B:
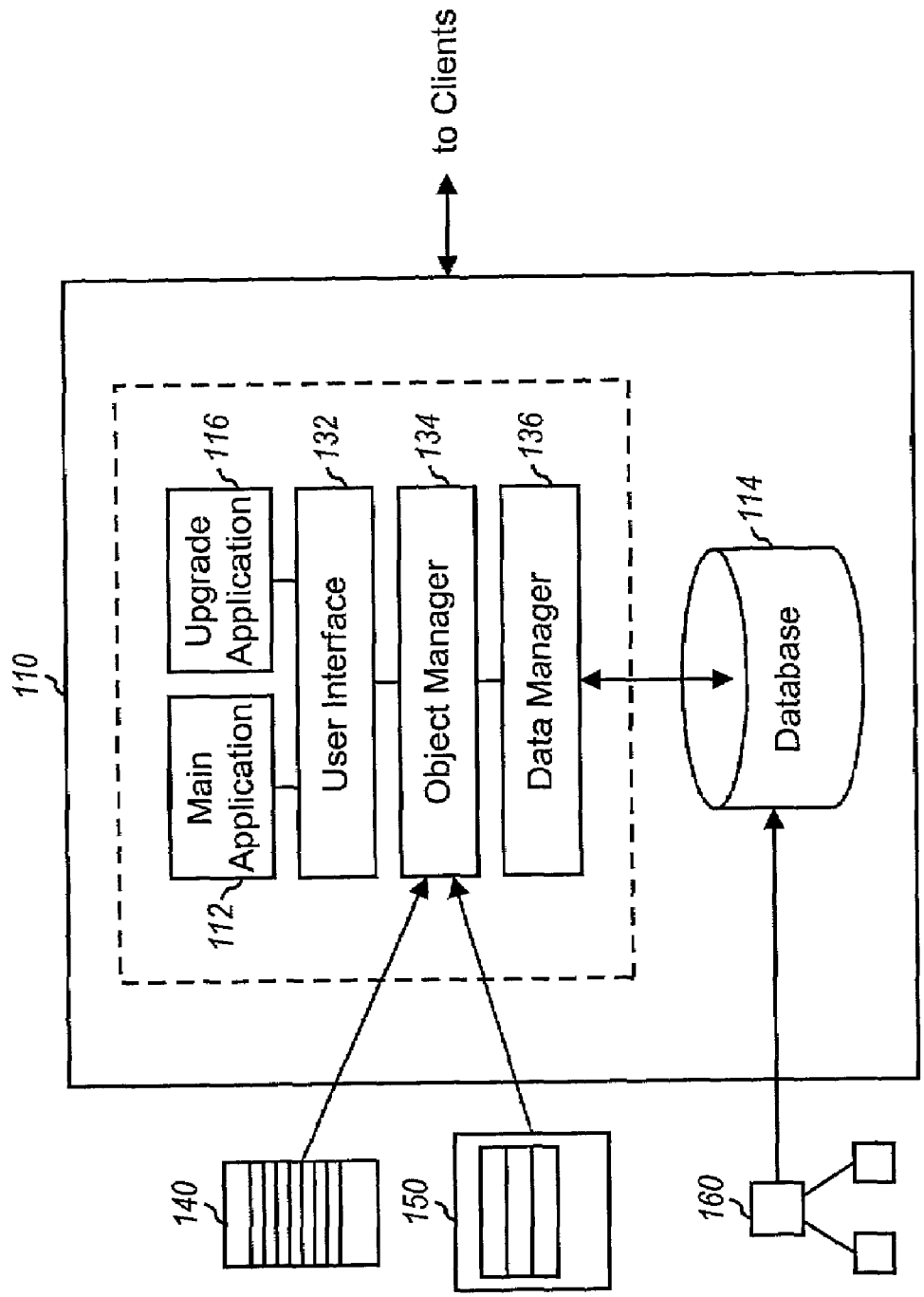

FIG. 1B is a diagram of an embodiment of an architecture for system 110. In this embodiment, system 110 includes the main and upgrade applications 112 and 116 as shown in FIG. 1A. System 110 further includes three (middle) architecture layers: a user interface 132, an object manager 134, and a data manager 136, all of which support the top-level applications 112 and 116. Different and/or additional architecture layers may also be implemented for system 110. User interface 132 provides interface with users (e.g., clients 130) via a set of screens, which may be used to display various menus, forms, and other representations. These menus, forms, and so on are typically generated by corresponding applets, which are high-level objects. Object manager 134 interacts with user interface 132 and provides the necessary data, e.g., for the forms being rendered. Object manager 134 further exchanges data between user interface 132 and data manager 136, as appropriate. Data manager 136 manages database 114 and typically performs this function by invoking SQL objects.

In the embodiment shown in FIG. 1B, a table 140 may be maintained by object manager 134 to support the maintenance, access, and modification of objects in database 114 during an upgrade process. Table 140 includes a list of objects in database 114 that are designated as being modifiable during the upgrade process. Another table 150 may be maintained to keep track of changes made to modifiable objects in database 114. Tables 140 and 150 are described in further detail below.

FIG. 1B also symbolically shows an object 160 that may be stored in database 114. Database 114 typically includes a large number of objects 160, some of which may be designated as being modifiable during the upgrade process and remaining ones of which are designated as being read-only.

System 120 may be implemented similar to system 110 shown in FIG. 1B.

Figure 2:
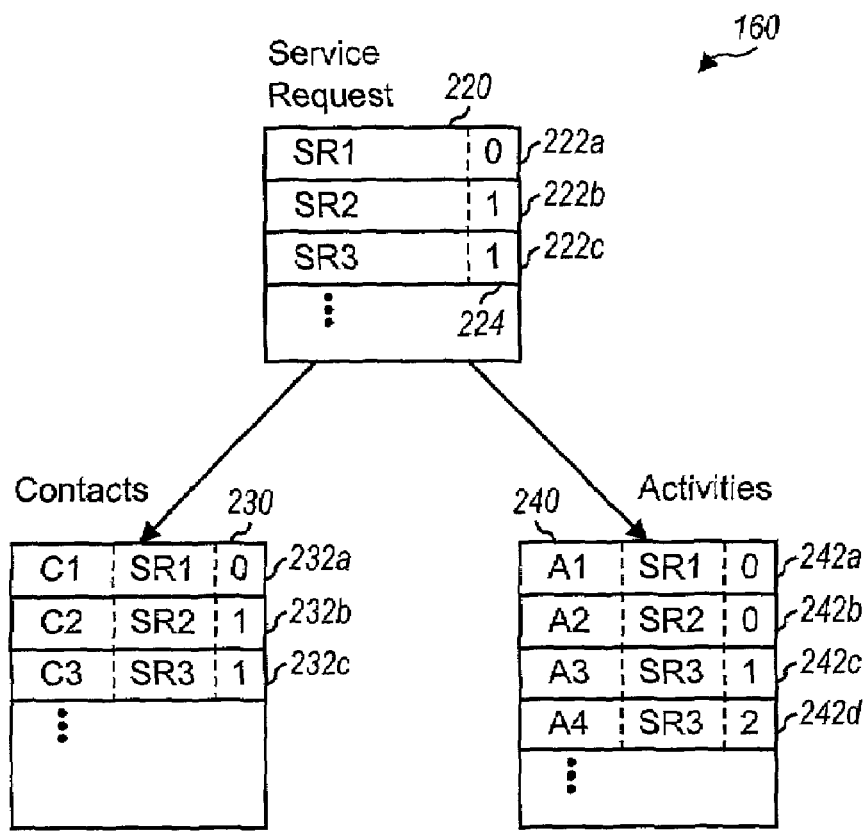
FIG. 2 is a diagram that illustrates a hierarchical structure for an object that may be stored in a database.

FIG. 2 is a diagram that illustrates a hierarchical structure for object 160, which may be one of many stored in the database. A main object class 220 (which may also be referred to as a "business component" class or a "business object" class) for a particular entity (e.g., "service requests") may include a number of objects 222, one object for each instance in the class. For example, objects 222a through 222c represent three service requests SR1 through SR3, respectively. Each object 222 may further reference one or more child objects. In the example shown in FIG. 2, an object class 230 for the "contacts" entity may include a number of objects 232, and an object class 240 for the "activities" entity may include a number of objects 242. Each object 222 in the service requests class 220 may reference one or more objects 232 in the contacts class 230 and one or more objects 242 in the activities class 240, and objects 232 and 242 are thus child objects of objects 222. For example, object 222a for service request SR1 references object 232a in contacts class 230 and object 242a in activities class 240. Each child object (e.g., 232 or 242) of a main object 222 may be a parent object that further references a number of child objects. The hierarchical structure may thus include any number of parent-child relationship layers.

In the embodiment shown in FIG. 2, each object includes an identifier (shown on the left side of the object) used to identify the object. For example, objects 222a through 222c are identified as SR1 through SR3. The identifier may be any designation (i.e., any combination of text and numerical values) used to specifically identify that object from among all objects in the database.

In the embodiment shown in FIG. 2, each object further includes a revision field (shown on the right side of the object) used to store a modification number. For example, revision field 224 is applicable to objects 222. In an embodiment, the modification number identifies the specific version of the object, and this number is incremented whenever a modification is made on the object. The modification number may be used to detect whether or not changes have been made to an object by comparing the modification number in the versions being compared. Alternatively, changes to an object may be detected by comparing objects field-by-field.

Figure 3:
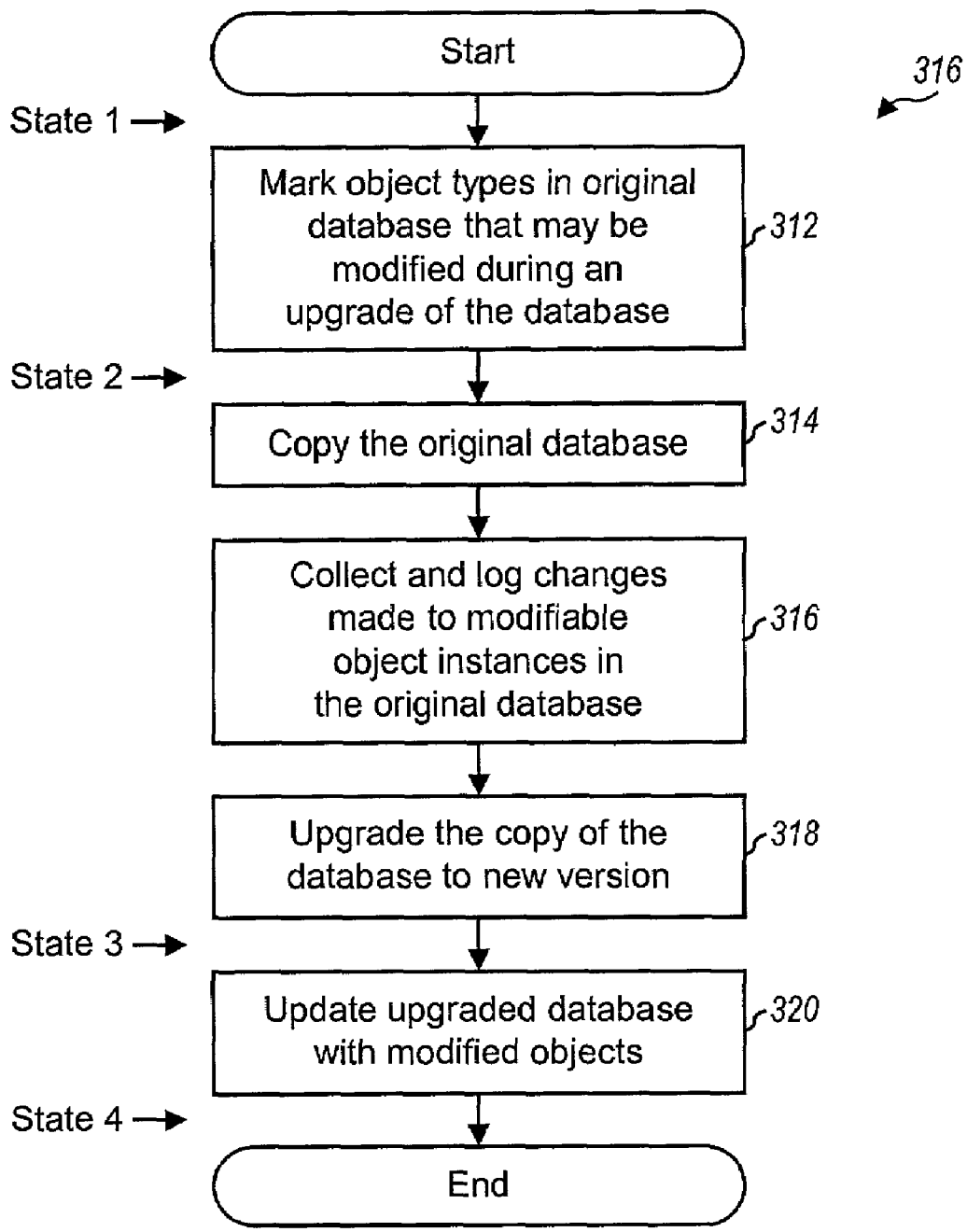
FIG. 3 is a flow diagram of an upgrade process, in accordance with an embodiment of the invention.

FIG. 3 is a flow diagram of an upgrade process 300, in accordance with an embodiment of the invention. Process 300 may be used to upgrade a database from one version to another version, and to make all or a subset of the objects in the original database available for modification during the upgrade process.

Initially, objects in the original database that are designated as being modifiable during the upgrade process are appropriately marked, at step 312. Typically, not all of the data in the original database needs to be made available during the upgrade process. Rather, only a subset of the data (e.g., for orders, service requests, accounts, and possibly other entities) may be required to be available. Thus, objects that must be made available for modification during the upgrade process may be identified with read/write capability, and remaining objects may be identified with read-only capability. The objects with read/write capability are also referred to herein as "modifiable" objects.

Step 312 may be achieved via one or more screens provided by upgrade application 116 executing on original system 110. The screens may also be used to configure original system 110 to operate in a particular mode (e.g., an "Original Mode") that permits changes only to modifiable objects and no others. Once system 110 is set in this mode, any user that interacts with original system 110 will be able to change only modifiable objects.

Once objects in the original database have been marked as either modifiable or read-only, the original database is copied, at step 314. This copying may be achieved using utilities included in upgrade applications 116 and/or 126. Alternatively, a backup may be maintained on original system 110, and a backup may be provided on upgraded system 120.

After the original database has been copied, changes to modifiable objects are collected and logged, at step 316. The logging can be achieved in a manner described below. During the entire upgrade process (possibly except during the time the copying is performed), the objects in the original database may be accessed and the modifiable objects may be modified.

The copy of the original database is then upgraded to a new version (i.e., a new schema and binaries), at step 318. This may be achieved using upgrade application 126.

In an embodiment, after the upgraded database has been created and made available (and possibly before it is updated with modified objects in the original database), users are allowed to access the upgraded database and modify the objects stored thereon. In fact, both the original and upgraded databases may be concurrently accessed. For this embodiment, all objects in the original database may be accessed and only modifiable objects may be modified, and all objects in the upgraded database may be accessed and modified (except for those intended to be read-only in the upgraded system). One set of users may be allowed to access the original database and, at the same time, a different or overlapping set of users may be allowed to access the upgraded database.

To ensure data integrity if users are allowed to access the upgraded system prior to the upgraded database being updated, a scheme may be implemented to ensure that any modification performed on an object in the upgraded database is done on the latest version of the object. A specific scheme to synchronize objects in the original and upgraded databases is described in further detail below. And if users are concurrently supported by both the original and upgraded systems, a scheme may be implemented to ensure that changes to either the objects in the upgraded database or their corresponding modifiable objects in the original databases are synchronized such that users on both systems access the latest version of the objects. Although all objects in the upgraded database may be modified, for simplicity, only objects in the upgraded database corresponding to the modifiable objects in the original databases are referred to as "modifiable" objects.

After the original database has been upgraded to the upgraded database, the upgraded database is updated with modifiable objects in the original database that have been modified, at step 320. In one embodiment, once the upgraded database has been updated, users on the original database are migrated to the upgraded database and the original database may be closed down. In another embodiment, users may be maintained on both databases and a scheme is implemented to ensure data integrity for any modification made on any object in any of the databases, as noted above. And in another embodiment, read and write may be performed on objects in the upgraded database and read-only access may be supported on the original database.

The steps in FIG. 3 and various processes to implement these steps are described in further detail below.

FIG. 3 also shows four defined states of the upgrade process, in accordance with a specific embodiment of the invention. The states represent non-overlapping time sequences, and the upgrade process moves from one state to another state when certain tasks are completed. A brief description of each of the states is provided below.

State 1 is indicative of a pre-upgrade operating state. In state 1, normal operation is supported by the original system 110 and users may modify business components as allowed in the "normal" configuration.

State 2 is indicative of a pre-upgrade operating state whereby limited availability is provided for the original database. In this state, all objects in the original database may be accessible but only objects marked as modifiable may be modified. Users are still accessing the original database and original system.

State 3 is indicative of a post-upgrade state whereby the original database has been upgraded but objects in the upgraded database may not be current. In one embodiment, all users are migrated to the upgraded system in state 3. In another embodiment, users are supported on both the original and upgraded systems in state 3. In state 3, various workflows may be invoked to update objects in the upgraded database with modifiable objects in the original database that have been modified.

State 4 is indicative of a post-update full availability state whereby the upgraded database has been updated and is current. In one embodiment, all users are migrated to the upgraded system in state 4, and normal operation is supported.

Some of the tasks that need to be performed to transition from one state to the next are described in further detail below.

In a specific embodiment, an "integration" object is created for each object in the original database that is designated as being modifiable during the upgrade process. An integration object is a canonical object that may be used to represent any type of object from various software vendors (e.g., a Siebel business object, SQL tables, and so on). For example, an integration object may be used to represent a business object, which may be used to represent a service request, an order, or some other entity. In an embodiment, the integration object includes fields corresponding to all fields in the modifiable object being represented. In another embodiment, the integration object includes only fields corresponding to those fields allowed to be changed in the modifiable object. The integration objects may be created using an application (e.g., a tools application such as a "Meta Data Definition Application") during the design phase and provided with the main application. Thereafter, a run-time application may be used to allow the users (e.g., an administrator) to select which ones of the objects in the original database are designated as modifiable and which fields of the objects may be modified (e.g., via the use of the defined integration objects). An integration object may thus be defined to support "filtering" such that only certain fields of an object is allowed to be modifiable and other fields may be maintained as read-only.

In another embodiment, each object in the original database is provided with a field used to indicate whether or not modification is allowed on the object during the upgrade process. For simplicity, various aspects and embodiments of the invention are described for the embodiment wherein modifiable objects are represented with integration objects.

In an embodiment, integration objects are similarly created for modifiable objects in the upgraded database. In an alternative embodiment, each object in the upgraded database is provided with a field that indicates whether or not the object corresponds to a modifiable object in the original database. In an embodiment, a table listing the modifiable objects is maintained for the upgraded database (similar to that for the original database). This table may be consulted to identify modifiable objects in the upgraded system.

Figure 4:
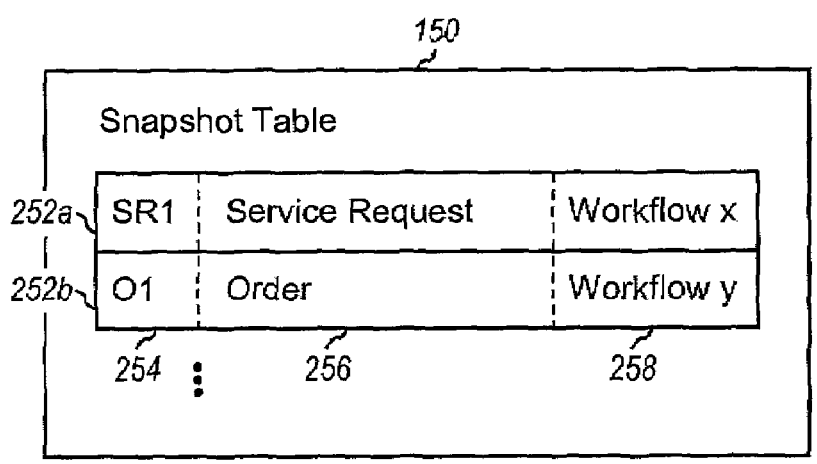
FIG. 4 is a diagram of an XML document that may be used to represent a snapshot of an integration object at a particular time and a snapshot table.

FIG. 4 is a diagram of an XML document 252 that may be used to represent a "snapshot" of an integration object at a particular time. The XML document is a representation that may be used to store the values in all the fields of an integration object to be saved. As part of the upgrade process, once the objects in the original database have been copied to the generate the upgraded database, a snapshot of an integration object in the original database is saved prior to making any modification on the object. Thereafter, this snapshot may be used to determine changes made to the object since it was copied to generate the upgraded database. The XML document stores an image of an entire integration object.

FIG. 4 also shows of an embodiment of a "snapshot" table 150 used to store snapshots of integration objects. Snapshot table 150 includes a row for each snapshot being stored. In an embodiment, each rows includes a row-ID 254 and a snapshot 256 of an integration object. Row-ID 254 is used to identify the element within the snapshot table, and may be passed as a parameter to a workflow used to retrieve an element from the snapshot table or to update or insert an element into the snapshot table. Integration object snapshot 256 may be the XML document described above.

In an embodiment, snap table 150 includes a field in each entry to indicate whether or not the corresponding integration object is unpublished (i.e., the object has been changed but the changes have not yet been sent to the upgraded database). Whenever changes are made to a modifiable object in the original database after it has been copied to generate the upgraded database or after it has been published (i.e., sent to the upgraded database), the row-ID of the modified integration object snapshot in the snapshot table and the identity (e.g., name) of the corresponding object in the original database are saved to the modifiable object table. Correspondingly, after a modified integration object has been published, its entry in the modifiable object table is updated accordingly (e.g., by marking the entry as having been published). The table may thus be used to maintain track of which integration objects have been modified so that the upgraded database may be properly updated after it is created.

In an embodiment, a table (i.e., table 140 in FIG. 1B) is maintained to list objects in the original database that are designated as being modifiable during the upgrade process. This "modifiable object" table may be consulted whenever a request to change an object in the original database is received. The table may include an entry for each modifiable object. Table 140 may further include workflow identifier used to identify the specific workflow used to generate the snapshot for the corresponding object. This workflow may be invoked to process the integration object snapshot to determine the values for the fields in the snapshot, which may be used to update a corresponding integration object.

Other schemes to track changes made to objects may also be used and are within the scope of the invention. In one such scheme, a transaction log table is maintained for the original database and each change on a modifiable object is logged to the table. The logging can be performed at various layers. For example, changes to individual fields of an object may be logged. The transaction log table may be implemented with a circular buffer structure. Whenever an object is changed, the changes are logged to the table and the table pointer is advanced. Whenever changes made to modifiable objects are requested, all changes logged since the last update are sent. The pointer indicating the last published changes is then advanced to the current location in the table.

As used herein, a workflow (engine) is a software module that allows software developers to create a sequence of services to be involved with predefined or variable parameters. A workflow is a specific sequence of services defined to solve a specific (business) problem. A service is a software module defined to implement a specific set of functionalities. And a query is typically a request to retrieve data from a database written using SQL.

In an embodiment, a workflow is provided and used to capture the state of a modifiable object before any changes are made to the object, so that subsequent changes to the object may be ascertained and reported. In an embodiment, a workflow that converts an integration object to an XML document is used to capture the state of the integration object. Various other workflows may also be used to perform the desired functions and are within the scope of the invention.

Figure 5:
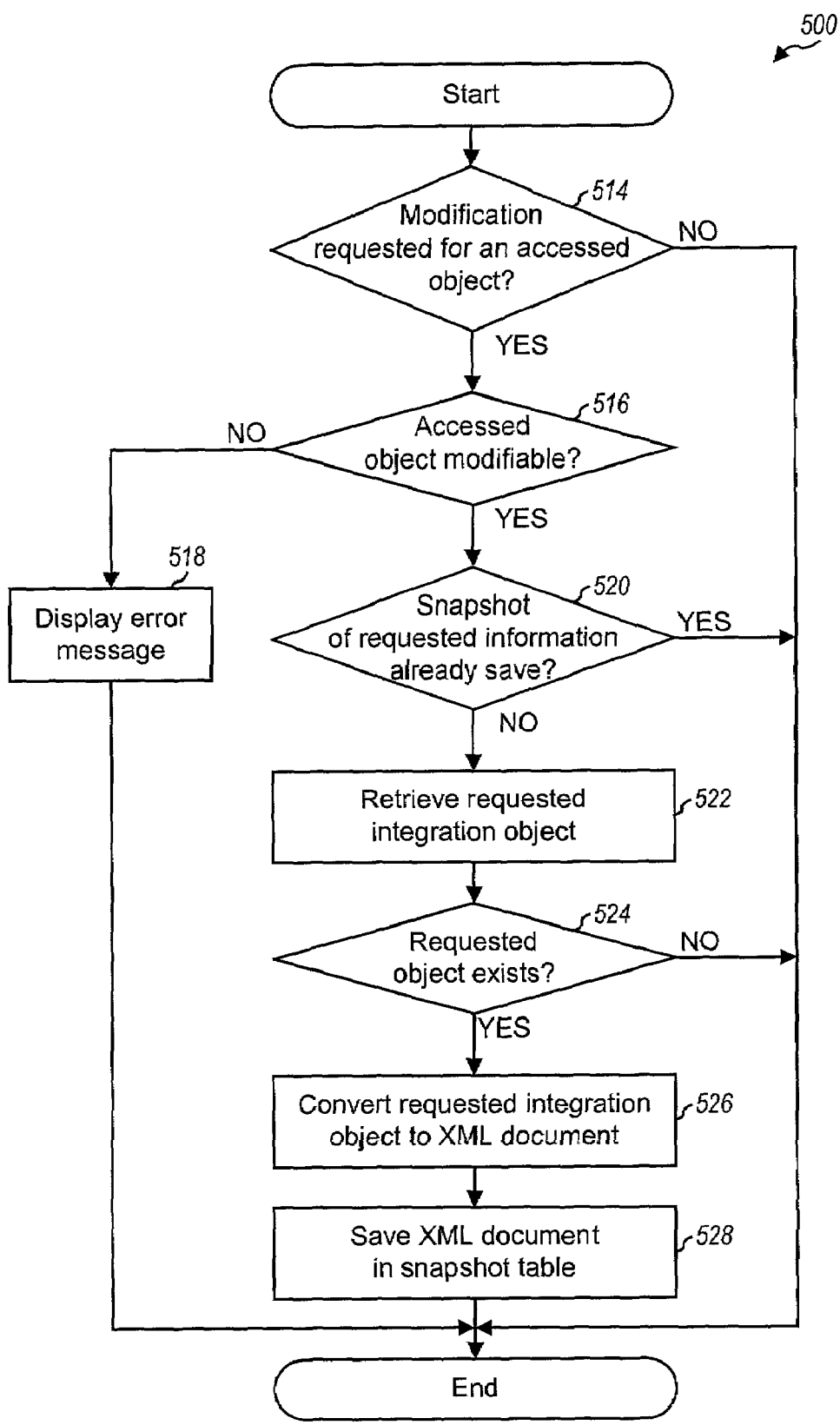
FIG. 5 is a flow diagram of a workflow to save a copy of a modifiable object in the original database prior to any modification on the object.

FIG. 5 is a flow diagram of an embodiment of an "Original Instance Pre-Update Event" workflow 500 used to save a copy of a modifiable object in the original database prior to any modification on the object. Workflow 500 may be invoked within step 316 in FIG. 3.

The modifiable and read-only objects in the original database may be accessed (i.e., retrieved) during the upgrade process. However, modification is only allowed for modifiable objects. In one embodiment (described below), workflow 500 is invoked each time an object in the original database is accessed. For this embodiment, a call event for an object may be hard coded into the software application so that no additional configuration is needed to enable any desired number of objects as modifiable. Alternatively, workflow 500 may be invoked before each attempted modification of a modifiable object in the original database.

If an object in the original database is accessed, a determination is made whether or not a modification is requested for the object, at step 514. If no modification is requested, then workflow 500 terminates (and another workflow or service may be invoked to provide the requested object from the original database). Otherwise, if modification is requested, a determination is made whether or not the object is modifiable, at step 516. This determination may be made by consulting the table that lists all modifiable objects. This table effectively provides access control for the modifiable objects. If modification is not allowed on the object, then an error message (e.g., "Modification not allowed on this object") may be displayed, at step 518, and workflow 500 terminates.

Otherwise, if modification is allowed for the object, then a determination is made whether or not a snapshot of the object has already been created and saved, at step 520. This may be determined by consulting the snapshot table using the row-ID for the object being accessed. In an embodiment, only a snapshot of the original version of an integration object is saved (if at all) in the snapshot table, and this save is performed the first time a request to modify a modifiable object is received. (A snapshot is also saved for published integration object, as described in further detail below.) Thus, if the snapshot of the object has already been saved, workflow 500 terminates.

Back at step 520, if this is the first modification request for the object, then a snapshot of the object is created and saved. This may be achieved by invoking an "adapter business" service to retrieve the integration object corresponding to the requested object, at step 522. In an embodiment, the adapter business service receives two input parameters: (1) the row ID of the (top-level) integration object corresponding to the requested object and (2) an indication of the operation being performed (e.g., a snapshot save, or a query). This integration object (e.g., a business object such as service request) may include child components (e.g., business components such as contacts and activities). The adapter business service then queries the entire (top-level) integration object out of the original database (e.g., by invoking a database query). If the integration object does not exist, as determined at step 524, then an error message may be returned by the service (not shown in FIG. 5), and workflow 500 terminates. Otherwise, if the integration object does exist and the input parameters indicate that a snapshot save is being performed, then the adapter business service converts the object to an XML document, at step 526.

Once the XML document has been created, workflow 500 stores the document to the snapshot table. This may be achieved by invoking a "snapshot access business" service (which may also be referred to as an incremental snapshot engine). In an embodiment, the snapshot access business service stores the row-ID and modification number of the objects in the top-level integration component. The snapshot access business service further stores the identifier (e.g., the name) of the integration object in the XML document, which may be used later to retrieve the integration object. The XML document is saved to the snapshot table, at step 528. Workflow 500 then terminates.

Workflow 500 thus saves a snapshot of an integration object, if one does not already exist in the snapshot table. Moreover, workflow 500 stores a "before" image of an object prior to modification. This "before" image is later used to ascertain changes made to the object (e.g., by comparing a current version of the integration object with the version stored in the snapshot table). The differences between the current and before images may then be transferred to the upgraded system.

Figure 6A:
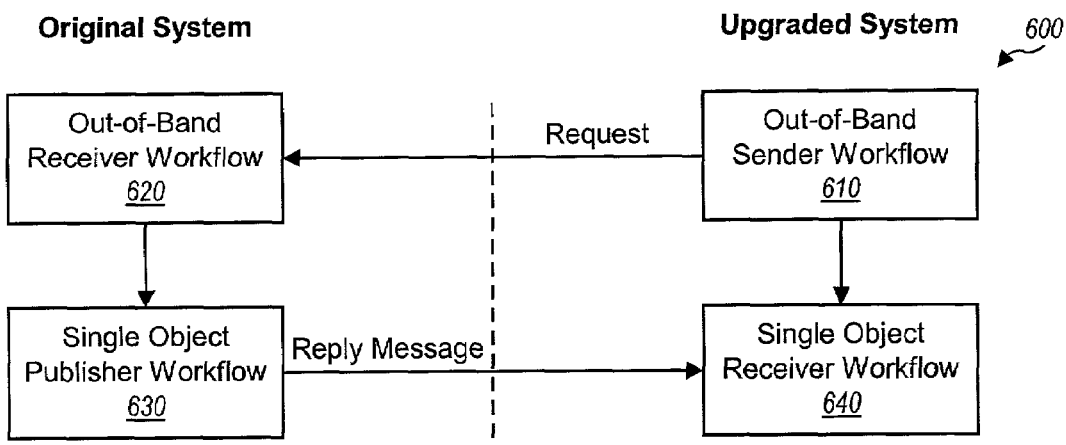
FIG. 6A is a diagram of a process to request the latest version of a modifiable object from the original system.

FIG. 6A is a diagram that illustrates a process 600 performed by the original and upgraded systems to request the latest version of a modifiable object from the original system. This process may be performed whenever (1) a user in the upgraded system requests modification of a modifiable object in the upgraded database or (2) a request is made (for any reason) to receive the latest version of a particular modifiable object from the original system. Process 600, which is also referred to as an "out-of-band" object retrieval process, may be initiate by (1) a user pressing a particular button provided via the upgraded system, (2) automatically whenever a modifiable object is accessed at the upgraded system, or (3) via some other means. Referring back to FIG. 3, process 600 may be performed in states 3 and 4 (i.e., after the upgraded database has been made created and made available in the upgraded system).

As shown in FIG. 6A, process 600 is initiated at the upgraded system by sending a request to the original system for a particular modifiable object. This request may be sent by invoking a "New Instance Out-of-Band Sender" workflow 610 at the upgraded system. The original system receives and processes the request via an "Original Instance Out-of-Band Receiver" workflow 620. Workflow 620 further invokes an "Original Instance Single Object Publisher" workflow 630, which determines whether or not there have been any changes to the requested modifiable object since it was last published. Workflow 630 then send a reply message that either indicates that no changes have been made to the object since the last version was published or includes a snapshot of the difference between the current and last published version. Alternatively, a snapshot of the latest version of the object may be sent. At the upgraded system, the reply message is received and processed via a "New Instance Single Object Receiver" workflow 640, which may update the corresponding modifiable object in the upgraded database based on the received message. Workflows 610, 620, 630, and 640 are described in further detail below.

Figure 6B:
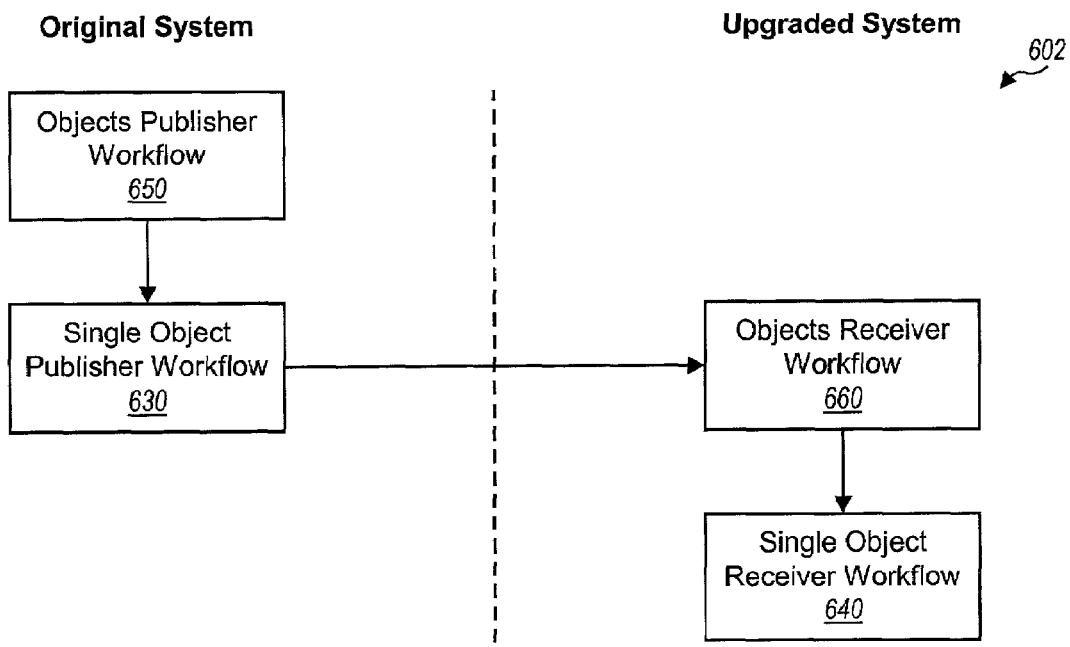
FIG. 6B is a diagram of a process to update objects in the upgraded database with the latest version of the modifiable objects in the original database.

FIG. 6B is a diagram that illustrates a process 602 performed by the original and upgraded systems to update the modifiable objects in the upgraded database with the latest version of the modifiable objects in the original database. Process 602 may be performed (in step 320 in FIG. 3) after the upgraded database has been created and made available at the upgraded system.

As shown in FIG. 6B, process 602 is initiated at the original system by invoking an "Original Instance Objects Publisher" workflow 650. Alternatively, workflow 650 may also be invoked in response to a command received from the upgraded system. Workflow 650 determines all modifiable objects in the original database that have been changed but not yet published to the new system. For each unpublished object, workflow 650 invokes Original Instance Single Object Publisher workflow 630 to publish the object to the upgraded system.

At the upgraded system, the published objects are received and processed by a "New Instance Objects Receiver" workflow 660. For each received published object, workflow 660 further invokes New Instance Single Object Receiver workflow 640, which updates the corresponding object in the upgraded database accordingly based on the received message. Workflows 640 and 660 are also described in further detail below.

Processes 600 and 602 may be performed at any time after the upgraded database has been created and made available. In an embodiment, if a particular modifiable object is requested from the upgraded system (e.g., via the out-of-band channel) and the requested object is being published (or recently published) by the original system (e.g., as part of the update process by workflow 650), then the latest version of the published object is resent via the out-of-band channel.

Figure 7:
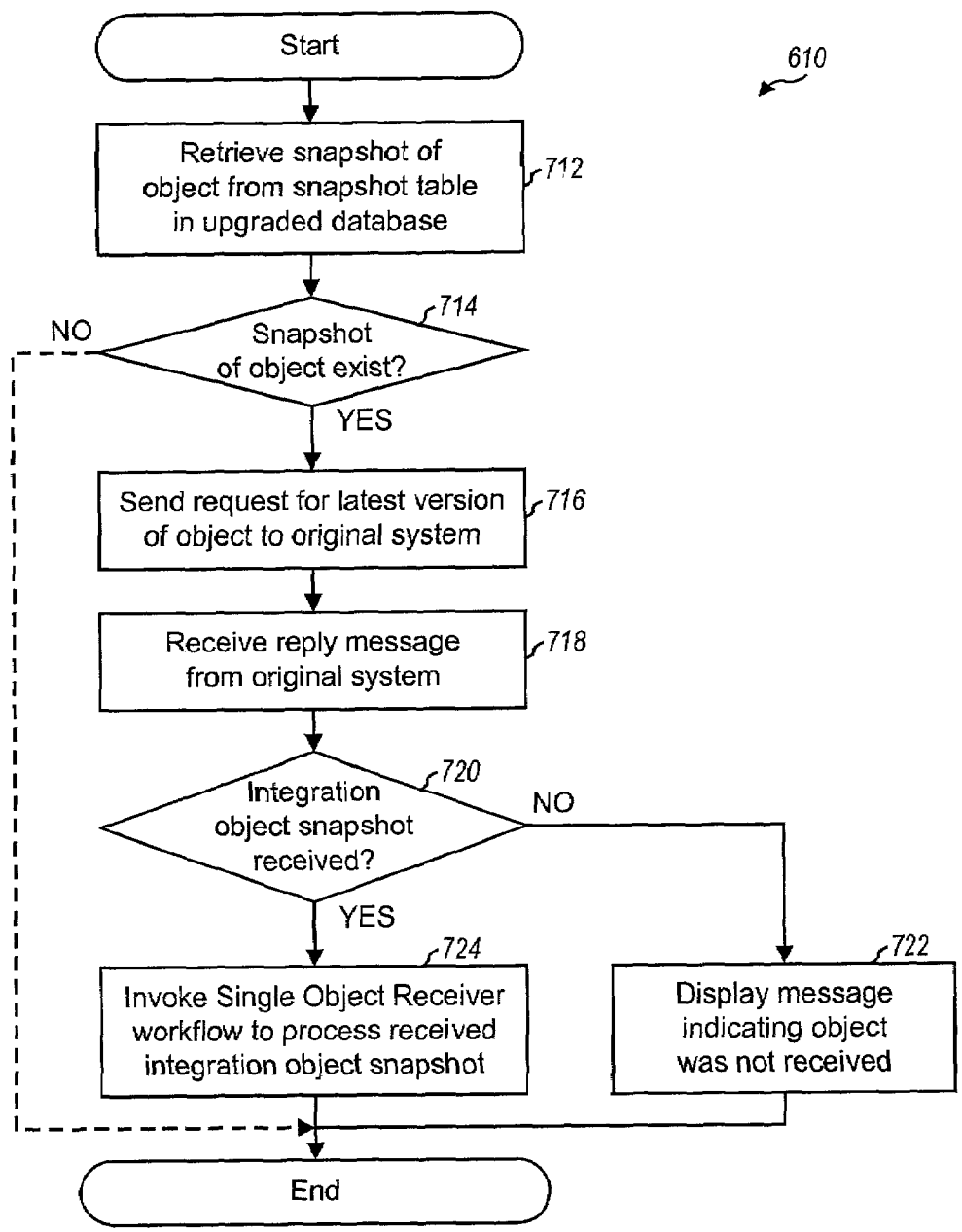
FIG. 7 is a flow diagram of a workflow to generate a request for the latest version of a particular modifiable object from the original system.

FIG. 7 is a flow diagram of an embodiment of New Instance Out-of-Band Sender workflow 610 (performed at the upgraded system) to generate a request for the latest version of a particular modifiable object from the original system. In one embodiment, all users on the original system are migrated to the upgraded system after the upgrade. For this embodiment, workflow 610 needs to be performed only once for each modifiable object, since after the modifiable object in the upgraded database has been updated, no additional changes will be made to the object via the original system. Workflow 610 receives the name (e.g., identifier) of the integration object to be requested and the row-ID of the integration object snapshot in the snapshot table in the upgraded system.

Initially, the snapshot of the integration object is retrieved (based on the row-ID) from the snapshot table in the upgraded system (i.e., the "upgrade" snapshot table), at step 712. This may be achieved by invoking the snapshot access business service. A determination is next made whether or not the snapshot of the integration object exists in the upgrade snapshot table, at step 714.

In one embodiment, modifiable objects are published once from the original system to the upgraded system (if all users are migrated from the original system after the upgraded database is available). A snapshot for each published object received from the original system may be saved in the upgrade snapshot table. For this embodiment, if the integration object snapshot already exists in the upgrade snapshot table (which indicates that the object has already been published), then workflow 610 terminates (as shown by the dashed line in FIG. 7). For this embodiment, if the integration object snapshot does not exist in the upgrade snapshot table, then workflow 610 proceeds to step 716 to retrieve the object, if it has been modified.

For other embodiments in which a modifiable object may be published more than once from the original system, step 714 may be skipped and workflow 610 proceeds to step 716 even if the integration object snapshot exists in the upgrade snapshot table.

At step 716, a request for the latest version of the object is sent from the upgraded system to the original system. This may be achieved by invoking an "MQ transport" service. In response, a reply message is received from the original system, at step 718. A determination is then made whether or not the reply message includes a snapshot of the integration object, at step 720. If no integration object snapshot was received, a message indicating such condition may be provided, at step 722, and workflow 610 then terminates. Otherwise, if an integration object snapshot was received in the reply message, then workflow 610 processes the received integration object snapshot, at step 744. This may be achieved by invoking New Instance Single Object Receiver workflow 640 (described below). Workflow 610 then terminates.

Figure 8:
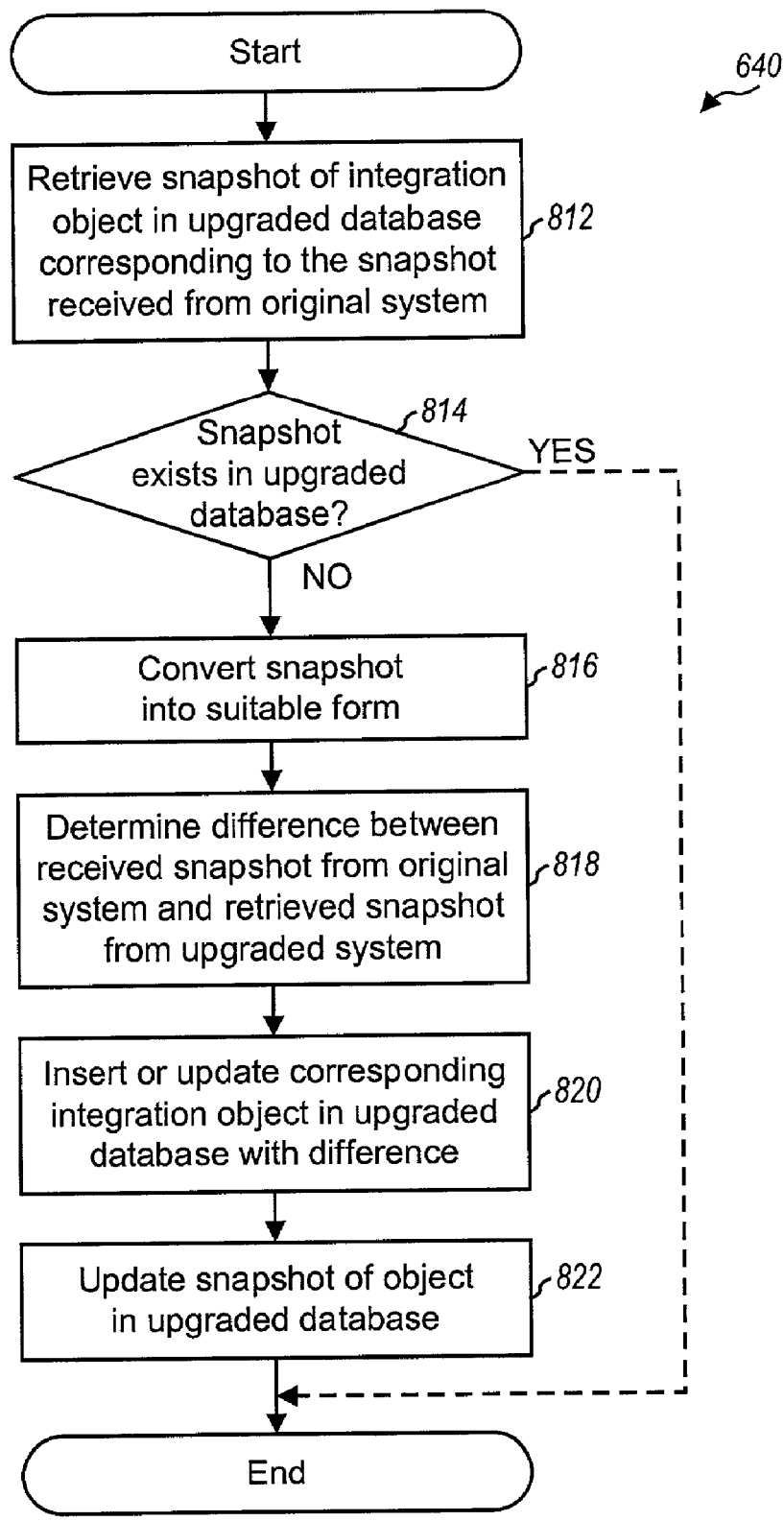
FIG. 8 is a flow diagram of a workflow to receive and process a snapshot of an integration object sent by the original system.

FIG. 8 is a flow diagram of an embodiment of New Instance Single Object Receiver workflow 640 (performed at the upgraded system) to receive and process a snapshot of an integration object sent by the original system. Workflow 640 receives the identifier of the integration object.

Initially, workflow 640 invokes the snapshot access business service to retrieve the integration object snapshot in the upgrade snapshot table (based on the row-ID) corresponding to the integration object snapshot received from the original system, at step 812. A determination is then made whether or not the snapshot exists in the upgrade snapshot table, at step 814. For the embodiment wherein modifiable objects are published once from the original system to the upgraded system, if the integration object snapshot already exists in the upgrade snapshot table (which indicates that the object has already been published), then workflow 640 terminates (as indicated by the dashed line in FIG. 8). For this embodiment, if the integration object snapshot does not exist, then the workflow proceeds to step 816. And for other embodiments in which a modifiable object may be published more than once from the original system, step 814 may be skipped.

At step 816, the integration object snapshot (i.e., an XML representation of the integration object) in the upgrade snapshot table is converted to an "in-memory" representation (e.g., a hierarchical tree structure) by invoking an "XML converter" service. The XML representation is simply a string, and the in-memory representation is a form that may be more easily manipulated.

At step 818, the difference between the integration object snapshot received from the original system and the snapshot retrieved from the upgrade snapshot table is determined. This may be achieved by invoking an incremental snapshot service. In one embodiment, the incremental snapshot service compares the received snapshot against the retrieved snapshot and provides an XML document (i.e., a "delta" snapshot) having the changes between the current version (received from original system) and the last update version (retrieved from the upgrade snapshot table). The difference can be determined and indicated at various levels. For example, the difference may be indicated for an entire object (i.e., top level), at a component level (e.g., individual child objects), or at a field level (e.g., individual attributes of each child and top-level object). In another embodiment, the incremental snapshot service simply provides the received snapshot indicative of the latest version.

The delta snapshot is then used to update the corresponding integration object in the upgraded database, at step 820. This may be achieved by invoking an adapter upsert service. The adapter upsert service either (1) inserts an integration object in the upgraded database corresponding to the received integration object snapshot (if such object does not already exist in the upgraded database) or (2) updates the object in the upgraded database with the delta snapshot (if such integration object already exists in the upgraded database). The delta snapshot is also used to update the upgrade snapshot table, at step 822, which then stores the last published version of the integration object snapshot. Workflow 640 then terminates.

Figure 9:
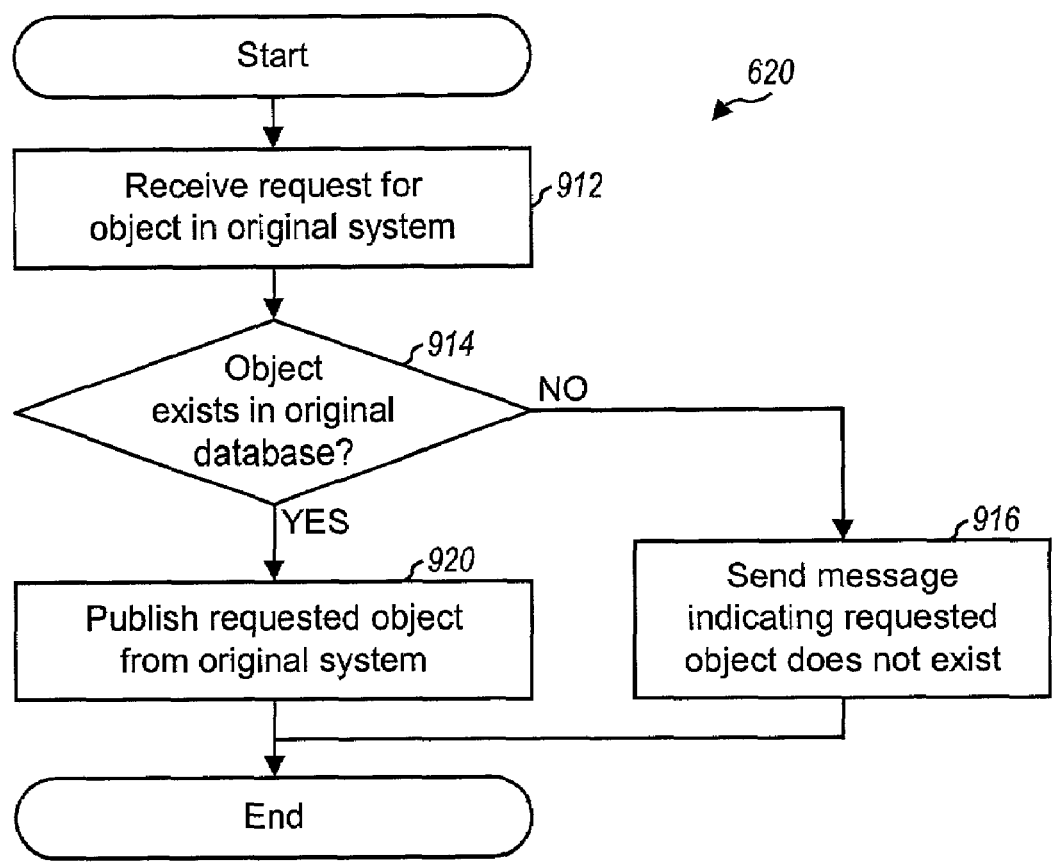
FIG. 9 is a flow diagram of a workflow to process a request to provide the latest version of a modifiable object stored in the original database.

FIG. 9 is a flow diagram of an embodiment of Original Instance Out-of-Band Receiver workflow 620 (performed at the original system) to process a request to provide the latest version of a modifiable object stored in the original database.

Initially, a request is received from the upgraded system for the latest version of a modifiable object in the original database, at step 912. A determination is then made whether or not the requested object exists in the original database, at step 914. If the requested object does not exist, a reply message is sent back indicating such condition, at step 916. Otherwise, if the requested object does exist, then the object is published from the original system to the upgraded system, at step 920. This may be achieved by invoking Original Instance Single Object Publisher workflow 630 (described below). Workflow 620 then terminates.

Figure 10:
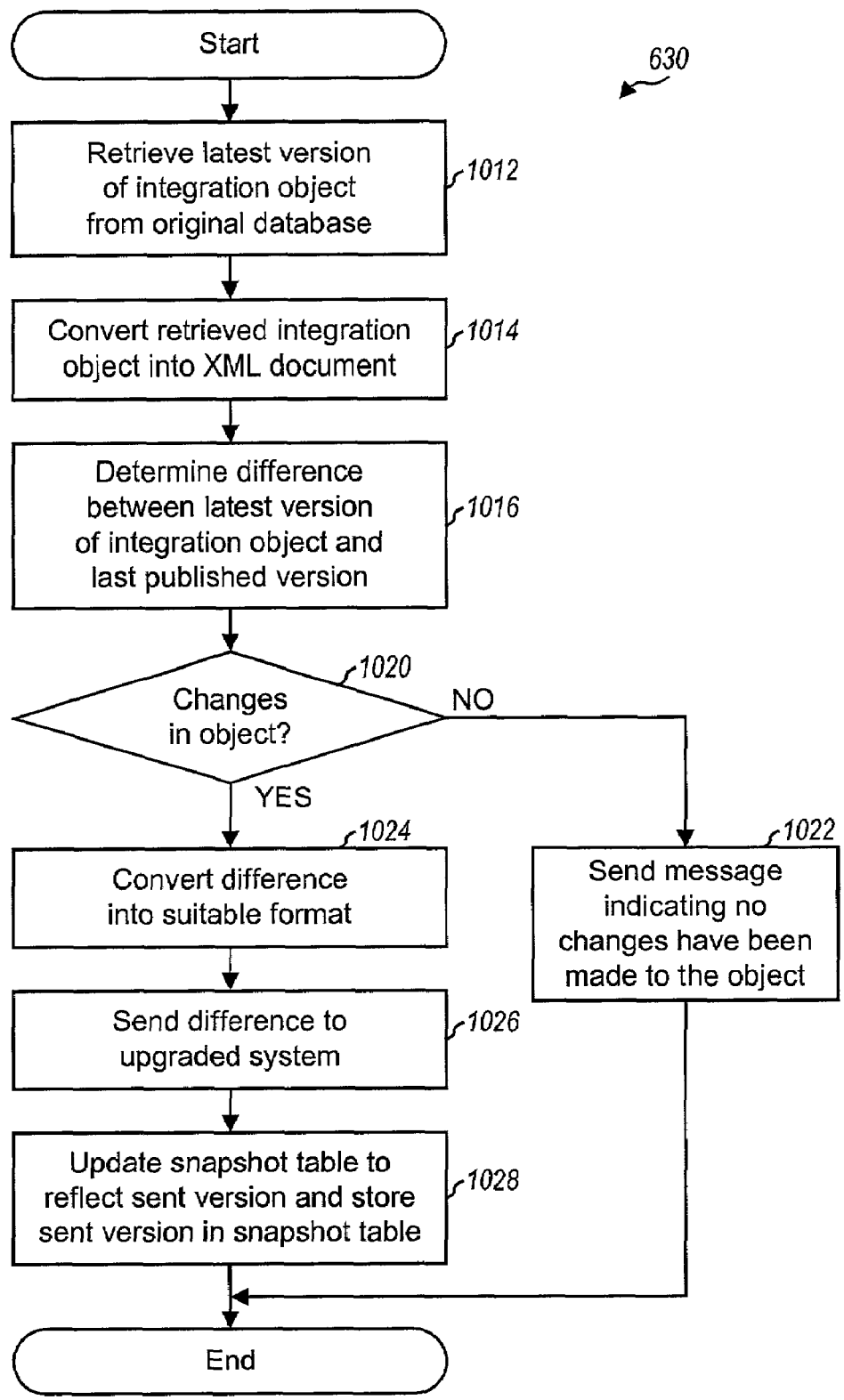
FIG. 10 is a flow diagram of a workflow to publish the latest version of a single integration object in the original database.

FIG. 10 is a flow diagram of an embodiment of Original Instance Single Object Publisher workflow 630, which is invoked to publish the latest version of a single integration object in the original database. Initially, the latest version of the integration object to be published is retrieved from the original database, at step 1012. This retrieval may be achieved by invoking the adapter business service. The adapter business service further converts the retrieved integration object into an XML document, at step 1014.

The difference between the latest version of the integration object in the original database and the last version published by the original system is then determined, at step 1016. This may be achieved by invoking the incremental snapshot service. In an embodiment, the difference is determined by comparing the XML documents for the snapshots of the latest and last published versions of the object. The difference may be determined and indicated at the various levels, as described above. For example, the difference may be determined on a field-by-field basis.

A determination is then made whether or not the latest version of the integration object has changed from the last published version, at step 1040. This may be achieved based on the difference between the latest and last published versions. If there are no changes in the integration object, then a message may be sent indicating such condition, at step 1022. Workflow 630 then terminates.

Otherwise, if there have been changes to the integration object, then the difference is converted into a suitable format, at step 1024. The difference is then published (i.e., sent) to the upgraded system, at step 1026, which may be achieved by invoking an "enqueue" service. The snapshot table in the original database is also updated to reflect the version that has just been sent, at step 1028. This may be achieved by storing the XML document for the latest published version in the snapshot table. Thus, in an embodiment, the difference is published and the latest version of the XML document is stored to the snapshot table. The entry in the modifiable object table for the modifiable object corresponding to the published XML document is also marked to indicate that this document has been published. Workflow 630 then terminates.

Figure 11:
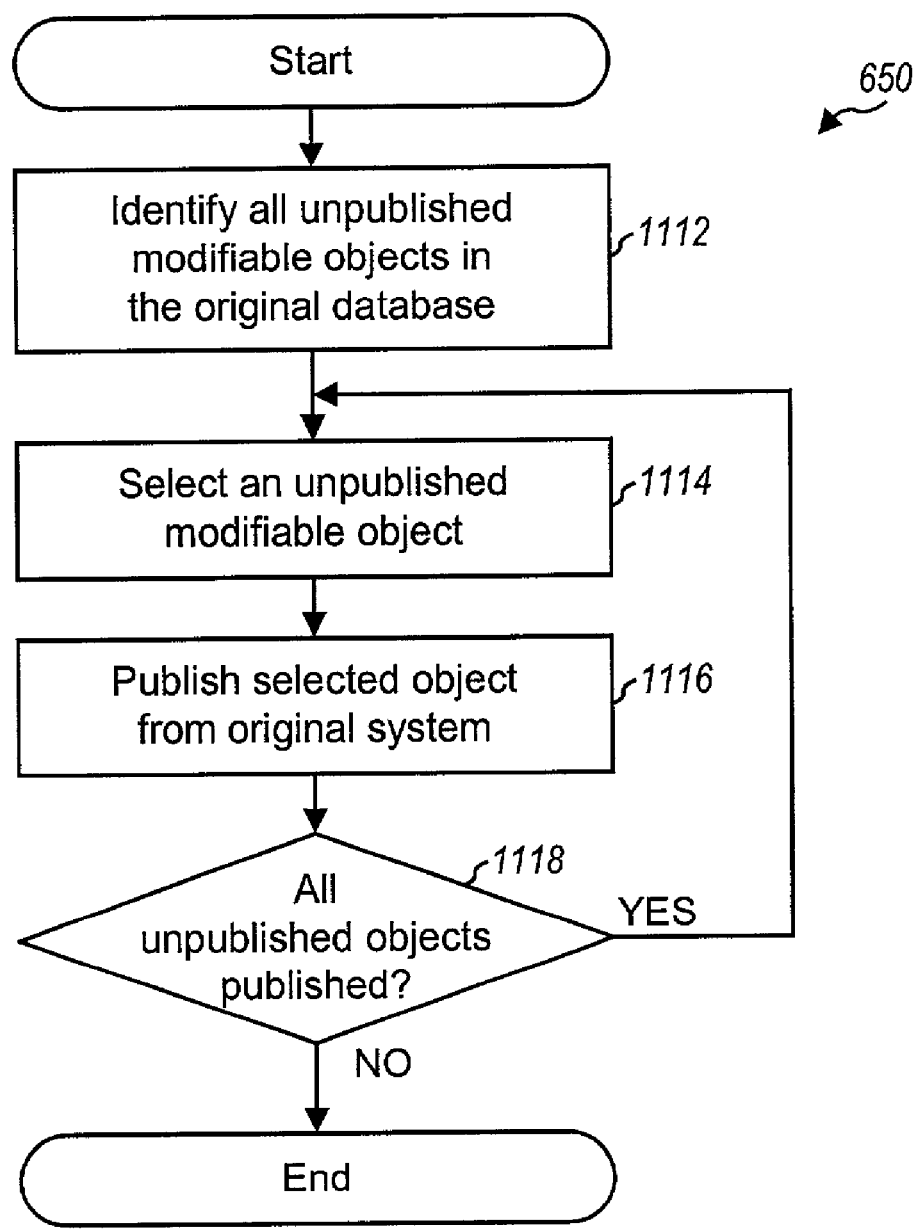
FIG. 11 is a flow diagram of a workflow to publish all unpublished snapshots of integration objects to the upgraded system.

FIG. 11 is a flow diagram of an embodiment of Original Instance Objects Publisher workflow 650 (performed at the original system) to publish all unpublished snapshots of integration objects to the upgraded system. Workflow 650 may be invoked (in step 320 of FIG. 3) to update the objects in the upgraded database.

Initially, all unpublished integration objects in the original database are identified, at step 1112. This may be achieved by invoking a "publisher business" service to call a channel administrator object to find all unpublished objects. An unpublished object is then selected, at step 1114, and the selected object is published, at step 1116. The selected object may be published by invoking Original Instance Single Object Publisher workflow 630, which is described above.

A determination is then made whether or not all unpublished objects have been published, at step 1118. If the answer is yes, then workflow 650 terminates. Otherwise, workflow 650 returns to step 1114 and the next unpublished object is selected for publication. Steps 1114 through 1118 are repeated for each unpublished object identified in step 1112.

Figure 12:
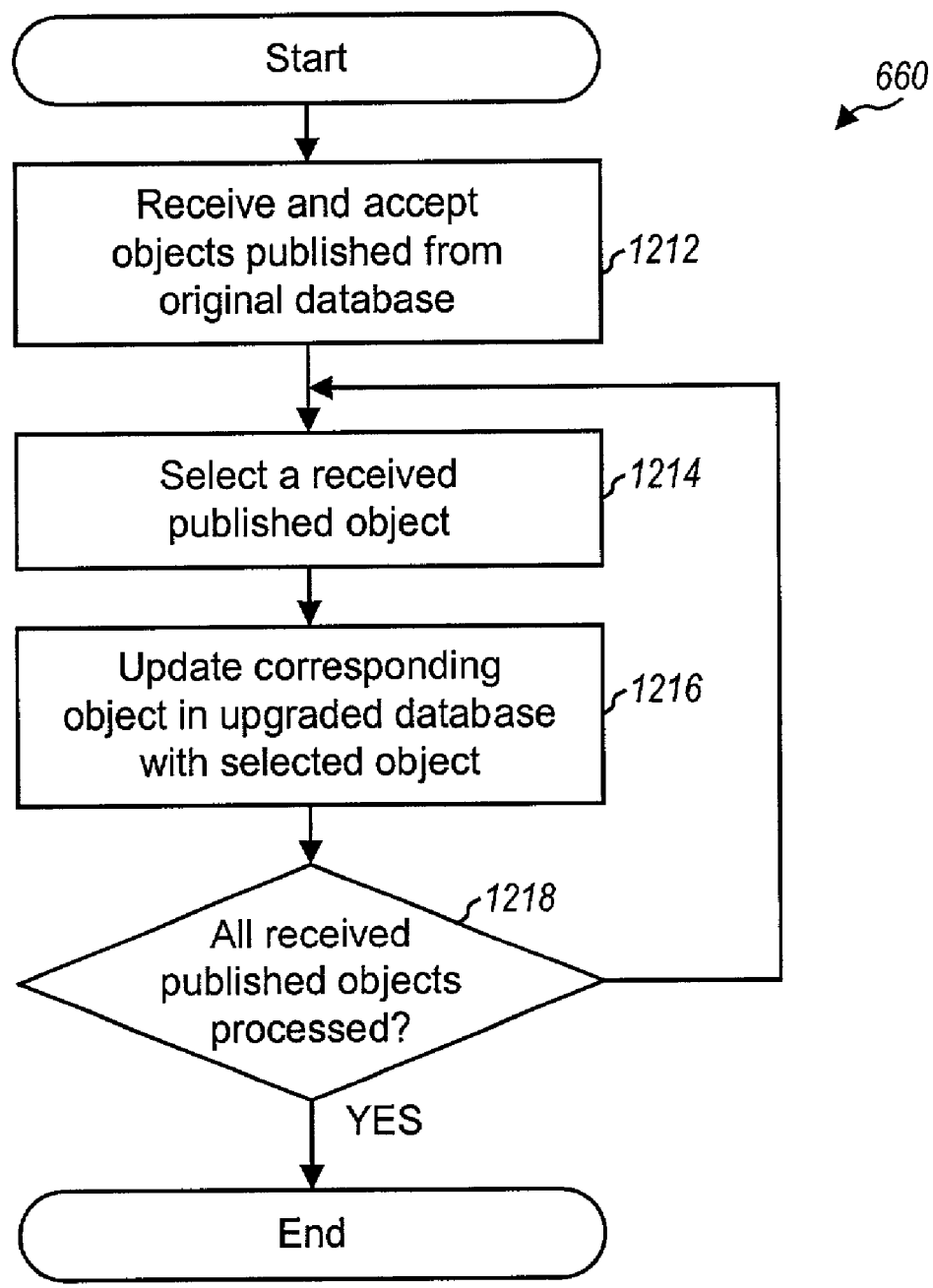
FIG. 12 is a flow diagram of a workflow to receive and process all unpublished integration object snapshots published by the original system.

FIG. 12 is a flow diagram of an embodiment of New Instance Objects Receiver workflow 660 (performed at the upgraded system) to receive and process all unpublished integration object snapshots published by the original system. Workflow 660 is complementary to workflow 650, and may also be invoked (in step 320 in FIG. 3) to update the objects in the upgraded database.

Initially, all objects published by the original system (via Original Instance Objects Publisher workflow 650) are received and accepted, at step 1212. This may be achieved by invoking an "MQ receiver" process that accepts unpublished objects from a known queue. A received object is then selected, at step 1214, and the selected object is used to update the corresponding object in the upgraded database, at step 1216. This object update may be achieved by invoking New Instance Single Object Receiver workflow 640, which is described above.

A determination is then made whether or not all received published objects have been processed, at step 1218. If the answer is yes, then workflow 660 terminates. Otherwise, workflow 660 returns to step 1214 and the next received published object is selected for processing. Steps 1214 through 1218 are repeated for each received published object.

Table 1 summarizes the workflows described above. In Table 1 "s_int_inst_ss_d" and "s_int_inst_ss" are columns in the snapshot table that store keys used to identify the object being stored. These keys are used for the snapshot and other services so that the proper object in the snapshot table are accessed.

TABLE 1

| Workflows | Arguments | | Actions and/or Expected Results | |
| --- | --- | --- | --- | --- |
| Original Instance Pre-Update Event Workflow FIG. 5 | a) b) | Existing integration object Non-existing integration object (IsPublished = false) | a) b) | A new record is added to s_int_inst_ss_d and s_int_inst_ss accordingly No record is added to s_int_inst_ss_d and s_int_inst_ss |

TABLE 1-continued

| Workflows | Arguments | Actions and/or Expected Results |
|---|---|---|
| Original Instance Objects Publisher Workflow FIG. 11 | a) channel name = test, snapshot type = "incremental by component", a valid workflow name<br>b) A non-existing workflow | a) For each record in s__int__inst__ss, a specified workflow is called<br>b) Display error message |
| Original Instance Single Object Publisher Workflow FIG. 10 | a) Integration object exists and the snapshot is changed.<br>b) A non-existing integration object<br>c) Snapshot is not changed<br>d) Testing begin-trans and end-trans | a) The snapshot of the integration object is sent out. Verify this by seeing a message on the specified queue. Publish__flg is set to be 'Y' for the given integration object in s__int__inst__ss table<br>b) Workflow skips the remaining steps and jumps to end-step. Error is logged.<br>c) Workflow skips the remaining steps and jumps to end-step. Error is logged.<br>d) Enqueue-send( ) and updateSnapshot should be in one transaction. If error occurs in either step, rollback properly. Error is logged. |
| Original Instance Out-of-Band Receiver Workflow FIG. 9 | a) The requested integration object snapshot exists and is changed.<br>b) The requested integration object snapshot does not exist.<br>c) The requested integration object does not exist.<br>d) The requested integration object snapshot has not changed. | a) A message containing this integration object is sent to the specified queue.<br>For b), c) and d), a proper error message is sent to the specified queue. |
| New Instance Out-of-Band Sender Workflow FIG. 7 | a) The requested integration object already exists in upgraded system.<br>b) No integration object snapshot is returned from original system.<br>c) Testing begin-trans and end-trans | a) Go to end-step.<br>b) Go to end-step.<br>c) When either step fails, update snapshot and upsert integration object should be rollback properly. |
| New Instance Single Object Receiver Workflow FIG. 8 | a) The requested integration object snapshot does not exist in the upgraded system and changed snapshot is sent back from original system. | a) The s__int__inst__ss__d and s__int__inst__ss is updated properly and updated integration object is updated in the database. |
| New Instance Objects Receiver Workflow FIG. 12 | a) The requested integration object snapshot does not exist on the upgraded system.<br>b) The requested integration object already exists on the upgraded system. | a) The s__int__inst__ss__d and s__int__inst__ss is updated properly and integration object is updated or inserted in the database.<br>b) Go to end step |

Each of the steps in the upgrade process shown in FIG. 3 may be implemented using various schemes, and this is within the scope of the invention. Some schemes that may be used for some of the steps are provided below for illustration.

Various schemes may be implemented to mark objects in the original database as modifiable or read-only for the upgrade process. In one scheme, users on the original system are logged out, objects in the original database are marked as either modifiable or read-only, and users may be logged back in the original system afterward. Users may also be logged back automatically after the objects have been marked.

Various schemes may be used to capture changed to modifiable objects. In the scheme described above, XML documents are used to capture changes to modifiable objects at the top-level object level. Other schemes may be used to capture changes to modifiable object at a lower level, such as the component or field level. Moreover, for an embodiment in which users are supported on both the original and upgraded systems after the upgraded database is available, various schemes may be used to distinguish between changes to modifiable objects made by users on the original system and "synchronization" changes made to the modifiable objects by the upgraded system.

Various schemes may be implemented to migrate data from the original system to the upgraded system. In one scheme, users are logged off both the original and upgraded systems to update the upgraded database with modified objects from the original database. Once the update is completed, users are allowed on the upgraded system. This scheme ensures data integrity. In another scheme, users are supported on the upgraded system once the upgraded database is available (before it is updated with modified objects from the original database). In this scheme, modifiable objects are accessible and modifiable via the upgraded system, and various mechanisms may be implemented to synchronize with the original system. And in yet another scheme, users are supported on both the original and upgraded systems once the upgraded database is available. For this scheme, modifiable objects are synchronized prior to use on either system to ensure that the latest version is used.

Various schemes may be implemented to migrate users from the original system to the upgraded system once the upgraded database is available. In one scheme, users in the original system are explicitly logged out from the original system and migrated to the upgraded system. In another scheme, users may be (concurrently) supported by both the original and upgraded systems after the upgraded database is available. Users on the original system may be migrated, e.g., in a staggered manner to the upgraded system.

In an embodiment, data transformation maps are provided for all integration objects created. The data transformation maps are used to convert between integration objects from different schemas.

Various schemes may be used to ensure data integrity. In one scheme, an owner is assigned to each modifiable object. The owner may be either the original system or the upgraded system. For this scheme, changes to a modifiable object are only performed after receiving permission from the object's owner. The techniques described above (e.g., workflows 610, 620, 630, and 640) may be used whenever necessary to request the latest version of a modifiable object from the owner. In another scheme, a modifiable object may be changed via either system. For this scheme, the techniques described above may be used to request the latest version of a modifiable object from the other system to ensure that changes are made to the latest version.

Various schemes may be used to synchronize objects in the original and upgraded databases. In one scheme, a button is provided on screens in the upgraded system that include modifiable objects. A user can hit the button to ensure that the latest copy of an object is accessed. In another scheme, the synchronization is automatically performed whenever a modifiable object is accessed.

Figure 13:
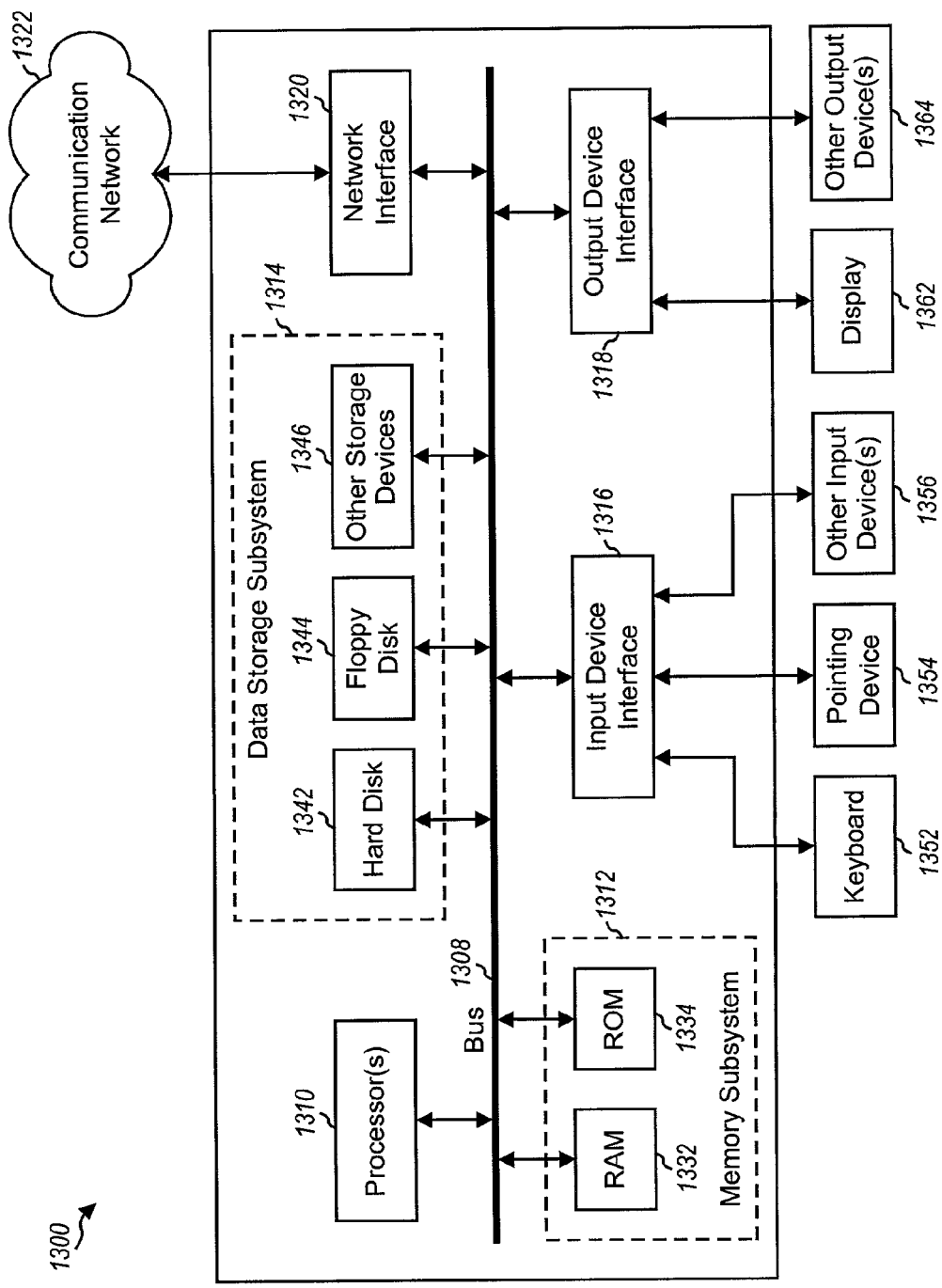
FIG. 13 is a block diagram of a computer system.

FIG. 13 is a block diagram of an embodiment of a computer system 1300 that may be used to implement systems 110 and 120 in FIGS. 1A and 1B. System 1300 includes a bus 1308 that interconnects major subsystems such as one or more processors 1310, a memory subsystem 1312, a data storage subsystem 1314, an input device interface 1316, an output device interface 1318, and a network interface 1320. Processor(s) 1310 perform many of the processing functions for system 1300 and communicate with a number of peripheral devices via bus 1308.

Memory subsystem 1312 may include a RAM 1332 and a ROM 1334 used to store codes and data that implement various aspects of the invention. In a distributed environment, the program codes and data may be stored on a number of computer systems and used by the processors of these systems. Data storage subsystem 1314 provides non-volatile storage for program codes and data, and may include a hard disk drive 1342, a floppy disk drive 1344, and other storage devices 1346 such as a CD-ROM drive, an optical drive, and removable media drive.

Input device interface 1316 provides interface with various input devices such as a keyboard 1352, a pointing device 1354 (e.g., a mouse, a trackball, a touch pad, a graphics tablet, a scanner, or a touch screen), and other input device(s) 1356. Output device interface 1318 provides an interface with various output devices such as a display 1362 (e.g., a CRT or an LCD) and other output device(s) 1364. Network interface 1320 provides an interface for system 1300 to communicate with other computers coupled to communication network 1322.

Many other devices or subsystems (not shown) may also be coupled to system 1300. In addition, it is not necessary for all of the devices shown in FIG. 13 to be present to practice the invention. Furthermore, the devices and subsystems may be interconnected in configurations different from that shown in FIG. 13. One or more of the storage devices may be located at remote locations and coupled to system 1300 via communication network 1322. The operation of a computer system such as that shown in FIG. 13 is readily known in the art and not described in detail herein. The source codes to implement certain embodiments of the invention may be operatively disposed in memory subsystem 1312 or stored on storage media such as a hard disk, a floppy disk, or a CD-ROM that is operative with a CD-ROM player.

The foregoing description of the specific embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein, and as defined by the following claims.

What is claimed is:

1. A computer program product for upgrading a database of objects, comprising a computer-usable medium having embodied therein computer-readable program codes for
    marking objects in a first database as either modifiable or read-only using a corresponding field in the respective objects, wherein modifiable objects are allowed to be changed during upgrade of the first database, and wherein read-only objects are not allowed to be changed during upgrade of the first database;
    creating a corresponding integration object for each modifiable object in the first database, wherein each integration object comprises at least those object fields that are allowed to be modified in the corresponding modifiable object, and wherein each integration object is independent of a software vendor-supplied type of the corresponding modifiable object;
    generating a second database of objects based on objects in the first database;
    sending a copy of each modifiable object in the first database to the second database;
    creating in said first database a first snapshot of a first integration object whose corresponding first modifiable object in said first database is to be modified after generation of said second database;
    sending said first snapshot to said second database;
    creating in said first database a second snapshot of said first integration object after said first modifiable object has been changed from a version used to generate the second database;
    sending said second snapshot to said second database;
    determining a first delta snapshot at said second database identifying differences between said first and said second snapshots; and
    updating the copy of said first modifiable object in the second database based on the first delta snapshot.

2. The computer program product of claim 1, wherein the computer-usable medium is further embodied with computer-readable program codes for maintaining a first table containing snapshots of integration objects corresponding to those modifiable objects that have been used to generate corresponding objects in the second database.

3. The computer program product of claim 2, wherein the computer-usable medium is further embodied with computer-readable program codes for maintaining a second table for snapshots of integration objects corresponding to modified objects in the first database not yet sent to the second database.

4. The computer program product of claim 1, wherein each of the first and the second snapshots is an XML document.

5. The computer program product of claim 1, wherein the computer-usable medium is further embodied with computer-readable program codes for
receiving a request for a latest version of a particular modifiable object in the first database; and
sending the latest version of the requested object to the second database using a third snapshot of a second integration object corresponding to said requested object.

6. The computer program product of claim 5, wherein the third snapshot includes only changes to the requested object since an immediately prior version of the requested object sent to the second database.

7. The computer program product of claim 5, wherein the latest version of the requested modifiable object is sent only if there has been changes since a prior sent version.

8. The computer program product of claim 5, wherein the computer-usable medium is further embodied with computer-readable program codes for updating an object in the second database corresponding to the requested object based on the third snapshot.

9. The computer program product of claim 8, wherein the computer-usable medium is further embodied with computer-readable program codes for
determining a second delta snapshot as a difference between the third snapshot and a fourth snapshot of a most current version of the requested object in the second database, and
wherein the object in the second database corresponding to the requested object is updated based on the second delta snapshot.

10. The computer program product of claim 5, wherein the computer-usable medium is further embodied with computer-readable program codes for:
storing said third snapshot in the first database.

11. The computer program product of claim 1, wherein the computer-readable program codes for updating further include program codes for
identifying modifiable objects in the first database having changes not yet sent to the second database,
sending changes in the modifiable objects in the first database to the second database using snapshots of corresponding integration objects, and
updating objects in the second database based on the snapshots of the corresponding modifiable objects in the first database.

12. The computer program product of claim 1, wherein the computer-readable program codes for generating the second database include program codes for
copying objects in the first database, and
upgrading the copied objects to generate the objects in the second database.

13. In a computer system, a method for upgrading a database of objects, comprising:
marking objects in a first database as either modifiable or read-only using a corresponding field in the respective object, wherein modifiable objects are allowed to be changed during upgrade of the first database, and wherein read-only objects are not allowed to be changed during upgrade of the first database;
creating a corresponding integration object for each modifiable object in the first database, wherein each integration object includes at least those object fields that are allowed to be modified in the corresponding modifiable object, and wherein each integration object is independent of a software vendor-supplied type of the corresponding modifiable object;
generating a second database of objects based on objects in the first database and sending a copy of each modifiable object in the first database to the second database;
creating in said first database a first snapshot of a first integration object whose corresponding first modifiable object in said first database is to be modified after generation of said second database;
sending said first snapshot to said second database;
creating in said first database a second snapshot of said first integration object after said first modifiable object has been changed from a version used to generate the second database;
sending said second snapshot to said second database;
determining a first delta snapshot at said second database identifying differences between said first and said second snapshots; and
updating the copy of said first modifiable object in the second database based on the first delta snapshot.

14. In a computer system, a method for upgrading a database of objects, comprising:
marking objects in a first database as either modifiable or read-only using a corresponding field in the respective object, wherein modifiable objects are allowed to be changed during upgrade of the first database, and wherein read-only objects are not allowed to be changed during upgrade of the first database;
creating a corresponding integration object for each modifiable object in the first database, wherein each integration object includes at least those object fields that are allowed to be modified in the corresponding modifiable object, and wherein each integration object is independent of a software vendor-supplied type of the corresponding modifiable object;
receiving an indication to start logging changes to a first modifiable object;
creating in said first database a first snapshot representing a first set of changes in a first integration object corresponding to the first modifiable object;
creating in said first database a second snapshot representing a second set of changes in the first integration object, wherein said second set of changes occurs after said first set of changes;
determining a delta snapshot identifying differences between said first and said second snapshots; and
receiving a request for a latest version of the first modifiable object in the first database; and
sending the first snapshot and the delta snapshot as representing the latest version of the first modifiable object.

15. The method of claim 14, wherein the first snapshot, the second snapshot, and the delta snapshot are XML documents.

16. A computer program product for upgrading a repository of objects, comprising:
code for marking objects in a first database as either modifiable or read-only using a corresponding field in the respective object, wherein modifiable objects are allowed to be changed during upgrade of the first database, and wherein read-only objects are not allowed to be changed during upgrade of the first database;

code for creating a corresponding integration object for each modifiable object in the first database, wherein each integration object includes at least those object fields that are allowed to be modified in the corresponding modifiable object, and wherein each integration object is independent of a software vendor-supplied type of the corresponding modifiable object;

code for generating a second database of objects based on objects in the first database;

code for sending a copy of each modifiable object in the first database to the second database;

code for creating in said first database a first snapshot of a first integration object whose corresponding first modifiable object in said first database is to be modified after generation of said second database;

code for sending said first snapshot to said second database;

code for creating in said first database a second snapshot of said first integration object after said first modifiable object has been changed from a version used to generate the second database;

code for sending said second snapshot to said second database;

code for determining a first delta snapshot at said second database identifying differences between said first and said second snapshots;

code for updating the copy of the first modifiable object in the second database based on the first delta snapshot; and a data storage medium configured to store the codes.

17. The computer program product of claim 1, wherein the computer-usable medium is further embodied with computer-readable program codes for maintaining a first table to identify modifiable objects in the first database.

18. The computer program product of claim 1, wherein the computer-usable medium is further embodied with computer-readable program codes for replicating changes made to said first modifiable object to said first integration object, so as to make said first integration object a copy of said first modifiable object.

19. The computer program product of claim 1, wherein the computer-usable medium is further embodied with computer-readable program codes for identifying whether each object in the second database corresponds to a modifiable object or a read-only object in the first database.

20. The computer program product of claim 4, wherein the computer-usable medium is further embodied with computer-readable program codes for converting, at said second database, said XML representations of said first and said second snapshots into a hierarchical data representation prior to determining said first delta snapshot.

21. The computer program product of claim 1, wherein said first database and said second database are part of a single computer system.

22. In a computer system, a method for upgrading a database of objects, comprising:

marking objects in a first database as either modifiable or read-only using a corresponding field in the respective object, wherein modifiable objects are allowed to be changed during upgrade of the first database, and wherein read-only objects are not allowed to be changed during upgrade of the first database;

creating a corresponding integration object for each modifiable object in the first database, wherein each integration object includes at least those object fields that are allowed to be modified in the corresponding modifiable object, and wherein each integration object is independent of a software vendor-supplied type of the corresponding modifiable object;

generating a second database of objects based on objects in the first database and sending a copy of each modifiable object in the first database to the second database;

replicating changes made to a first modifiable object in the first database to a first integration object corresponding thereto, so as to make said first integration object a copy of said first modifiable object;

creating in said first database a first snapshot of a latest version of said first integration object;

sending said first snapshot to said second database; and updating the copy of said first modifiable object in the second database based on the first snapshot.

* * * * *

UNITED STATES PATENT AND TRADEMARK OFFICE
CERTIFICATE OF CORRECTION

PATENT NO. : 7,310,653 B2  Page 1 of 1
APPLICATION NO. : 10/113848
DATED : December 18, 2007
INVENTOR(S) : Coyle et al.

It is certified that error appears in the above-identified patent and that said Letters Patent is hereby corrected as shown below:

On the face page, in field (75), in "inventors", in column 1, line 1, after "Mark" insert -- S. --.
On the face page, in field (75), in "inventors", in column 1, line 2, after "Peter" insert -- S. --.
On the face page, in field (75), in "inventors", in column 1, line 3, delete "Freemont," and insert -- Fremont, --, therefor.
In column 7, line 55, after "to" delete "the".
In column 14, line 55, delete "object" and insert -- objects --, therefor.

Signed and Sealed this

Second Day of September, 2008

JON W. DUDAS
*Director of the United States Patent and Trademark Office*